United States Patent [19]
Barényi

[11] 3,894,763
[45] July 15, 1975

[54] RESILIENT VEHICLE BUMPER STRIP

[75] Inventor: Béla Barényi, Maichingen, Germany

[73] Assignee: Daimler-Benz Aktiengesellschaft, Germany

[22] Filed: Mar. 9, 1973

[21] Appl. No.: 339,876

[30] Foreign Application Priority Data
Mar. 9, 1972 Germany.............................. 2211365

[52] U.S. Cl.................. 293/1; 16/86 R; 24/73 HS; 52/717; 114/219; 293/62; 293/71 R; 293/99
[51] Int. Cl...... B60j 11/00; B60r 19/08; E04f 19/02
[58] Field of Search ........ 16/86, 86 A, 86 R; 24/73, 24/73 HS; 293/1, 62, 71 R, 71 P, 88, 96, 99; 114/219; 52/716, 717, 718

[56] References Cited
UNITED STATES PATENTS

| | | | |
|---|---|---|---|
| 2,585,438 | 2/1952 | Clingman.............................. | 16/86 |
| 2,986,419 | 5/1961 | Barenyi................................. | 293/62 |
| 3,019,758 | 2/1962 | Erkert................................... | 114/219 |
| 3,122,804 | 3/1964 | Stawinski............................. | 24/73 |
| 3,251,103 | 5/1966 | Saut...................................... | 24/73 |
| 3,441,305 | 4/1969 | Trammell, Jr. ...................... | 293/1 |
| 3,517,473 | 6/1970 | Kistner et al. ...................... | 293/1 X |
| 3,572,799 | 3/1971 | Truesdell et al. .................. | 293/62 X |
| 3,606,431 | 9/1971 | Kunevicius........................... | 293/1 |

FOREIGN PATENTS OR APPLICATIONS
858,506   12/1952   Germany .............................. 293/62

Primary Examiner—M. Henson Wood, Jr.
Assistant Examiner—Howard Beltran
Attorney, Agent, or Firm—Craig & Antonelli

[57] ABSTRACT

A protective strip for motor vehicles, especially for passenger motor vehicles, which includes an elastic profile that projects into a groove-like indentation of the vehicle body covering in which it is secured by a retaining means engaging into a slot provided on the backside of the profile; the slot thereby extends up to the outer area of the elastic profile overlapping the indentation where it receives a reinforcing element extending in the longitudinal direction of the elastic profile.

21 Claims, 13 Drawing Figures

FIG. 9
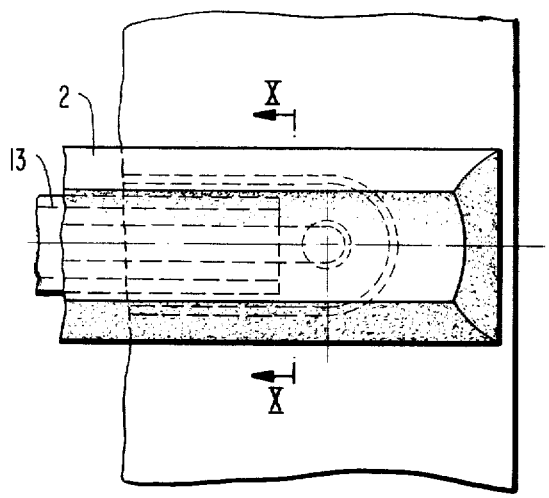
FIG. 10
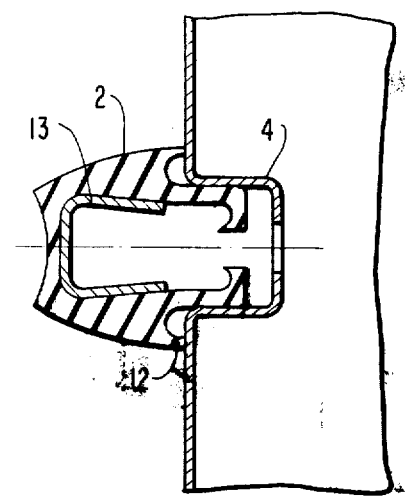
FIG. 11
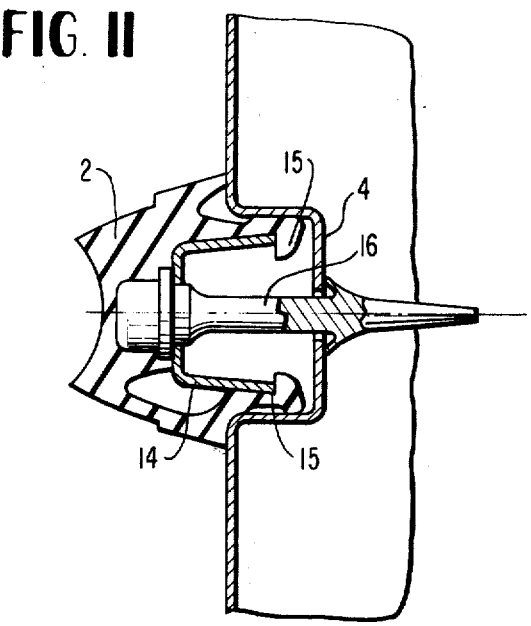
FIG. 12
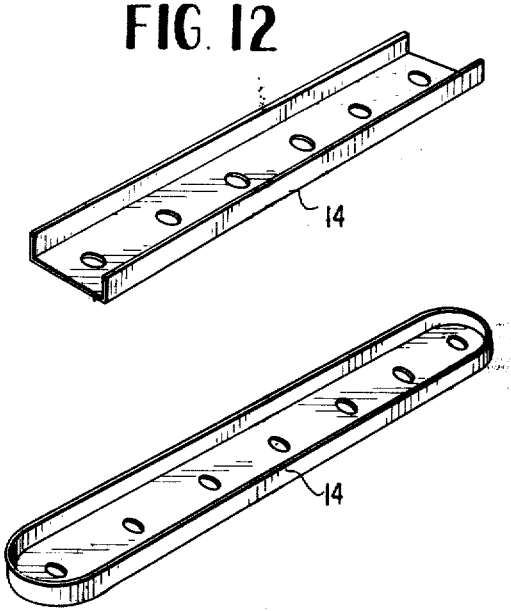
FIG. 13

RESILIENT VEHICLE BUMPER STRIP

The present invention relates to a protective strip for motor vehicles, especially for passenger motor vehicles, which includes an elastic profile that projects into a groove-like indentation or recess of a vehicle body covering, in which the elastic profile is secured by retaining means engaging in a slot provided on the backside thereof.

The protective strips possessing a profile of rubber or rubber-like elastic material are customarily secured on the smooth, continuous or embossed portions of the outside of a vehicle body covering. These elastic profiles have to be additionally equipped with reinforcing profiles which are to assure an unchanged rectilinear configuration of the elastic profile also at higher temperatures and/or over longer operating periods. The reinforcing profiles are, for the most part, mounted externally at these elastic profiles, as it entails difficulties to insert the reinforcing profiles into the elastic profiles. However, the danger exists that these reinforcing profiles are already damaged when the protective strips are subjected to their intended use, according to which they are to be capable of elastically absorbing slight impacts. Therebeyond, these reinforcing means may reduce under certain circumstances the elastic effect of the protective bars.

A protective strip of the aforementioned type is known in the prior art (German Patent No. 858,506) in which the elastic profile is secured in a groove-like indentation of a vehicle body covering. In this prior art construction, exclusively retaining means are provided which are to be detachable from the outside. Inter alia, with this type of construction, a slot is provided on the backside of the elastic profile, by way of which is inserted a steel band that is retained in an aperture extending perpendicularly to the slot. This type of construction which, as such, is favorable, however, leads to difficulties if the protective strip is to extend over mutually relatively movable parts, for example, over the outer vehicle body covering panels and the adjoining door of a motor vehicle. If a protective strip projecting very far beyond the contour of the vehicle body covering is to be produced, then appropriately also with this type of construction a reinforcing profile should be provided which takes over the guidance of the elastic profile. The same difficulties then arise which were mentioned already with respect to the other prior art types of construction.

The present invention is concerned with the task to provide a protective strip of the aforementioned type, in which a reinforcing profile is adapted to be accommodated in a simple manner and which can be readily assembled and mounted at a motor vehicle. The present invention essentially consists in that the slot extends up to into the outer area of the elastic profile overlapping the indentation and receives thereat a reinforcing element extending in the longitudinal direction of the profile. The reinforcing element can be inserted readily into the elastic profile by way of the slot. Nonetheless, it disturbs only little the elastic effect of the protective strip since it has to produce a reinforcement only in a direction parallel to the vehicle body covering whereas it can be constructed readily deformable in a direction perpendicular thereto.

In one advantageous embodiment of the present invention, a retaining or mounting profile extending within the area of the indentation is inserted into the slot, which is preferably secured by means of clips at the bottom of the indentation of the vehicle body covering. It is achieved thereby that the protectrive strip is secured very reliably at the vehicle body covering so that the danger is avoided that the protective strip disengages or becomes detached from the vehicle body covering during an accident and then projects lance-like from the vehicle. In particular, if the retaining profile is made of synthetic plastic material, such as synthetic resinous material, it is advantageous if the clips are constructed in one piece with the retaining or mounting profile. In order to be able to compensate during the assembly in a simple manner for any tolerances in the distance of the bores necessary for the accommodation of the clips, it is favorable if the mounting or retaining profile is subdivided into short individual portions.

Provision is made in one embodiment of the present invention that the reinforcing element consisting of band material and disposed approximately parallel to the surface of the vehicle body covering is curved within the area of the protective strip toward the vehicle body covering. As a result thereof, the reinforcing element assists to secure the elastic profile at the vehicle body covering within the area of the ends of the protective strip. It is thereby particularly advantageous if the reinforcing element and/or the mounting profile extends up to into the end portions which adjoin the elastic profile. It is possible thereby to retain the end portions with the aid of the reinforcing element and/or of the retaining profile and simultaneously to center the end pieces with respect to the remaining elastic profile.

According to a further feature of the present invention, provision is made that the reinforcing element and the retaining or mounting profile are made in one piece.

Accordingly, it is an object of the present invention to provide a protective strip for motor vehicles, especially for passenger motor vehicles which avoids by simple means the aforementioned shortcomings and drawbacks encountered in the prior art.

Another object of the present invention resides in a protective strip for motor vehicles which assures a rectilinear configuration of the elastic profile also at higher temperatures and/or after longer periods of operation.

A further object of the present invention resides in a protective strip or bar for motor vehicles, especially for passenger motor vehicles, which minimizes, if not eliminates, the danger of damages to the protective strip when exposed to its intended wear and tear under normal use thereof.

Still a further object of the present invention resides in a protective strip for motor vehicles which minimizes the danger of injury to pedestrians or passers-by owing to partial detachment of the protective strip from the body of the vehicle.

Another object of the present invention resides in a protective strip for motor vehicles which can be readily used also with body parts that are movable relative to one another and in which a reinforcing profile can be accommodated in a simple manner.

A further object of the present invention resides in a protective strip of the aforementioned type which can be readily mounted on the vehicle body and which permits compensation for tolerances in the spacing of the bores necessary to accommodate the retaining elements.

These and further objects, features and advantages of the present invention will become more apparent from the following description when taken in connection with the accompanying drawing which shows, for purposes of illustration only, several embodiments in accordance with the present invention, and wherein:

FIG. 9 is a partial elevational view of a still further embodiment of a protective strip according to the present invention;

FIG. 10 is a cross-sectional view taken along line X—X of FIG. 9;

FIG. 11 is a cross-sectional view through still another embodiment of a protective strip in accordance with the present invention;

FIG. 12 is a perspective view of a detail of a protective strip in accordance with the present invention; and FIG. 13 is a perspective view of a modified embodiment of the part of the protective strip of FIG. 12.

Figure 1:
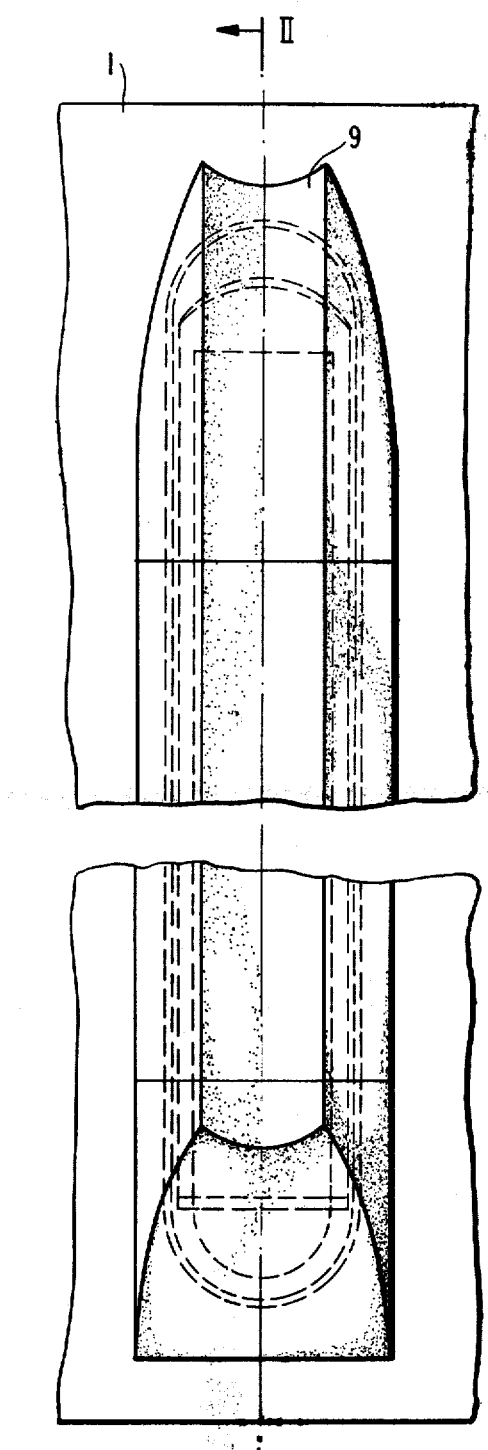
FIG. 1 is an elevational view of a protective strip according to the present invention mounted at a vehicle outer body covering.

Referring now to the drawing wherein like reference numerals are used throughout the various views to designate like parts, and more particularly to FIGS. 1–4, a protective strip is illustrated in these figures which is mounted at a vehicle body covering, for example, at a door 1 of a passenger motor vehicle illustrated in partial section. As can be seen in particular from FIGS. 1, 2 and 3, the protective strip terminates in front of the lateral edges of the door 1. The protective strip includes an elastic profile 2 of rubber or rubber-like elastic material. This elastic profile 2 is secured at an indentation 4 of the vehicle body covering with the aid of a mounting or retaining profile 3.

The elastic profile 2 possesses an essentially C-shaped cross section and is open in the direction toward the indentation 4 by a slot 5. The approximately U-shaped retaining profile 3 is inserted into the elastic profile 2 by way of this slot 5 whereby its legs extend outwardly approximately parallel to the upper and lower walls of the indentation 4. The indentation 4 thereby tapers in the direction toward the vehicle interior side so that a dove-tail-like fastening and mounting is achieved with the aid of the retaining or mounting profile 3.

The retaining or mounting profile 3 is constructed in the illustrated embodiment in one piece with the clips 6 which are inserted into bores of the bottom of the indentation 4.

The slot 5 of the elastic profile 2 extends up to approximately the outer edge of the elastic profile 2 so that the latter possesses essentially the shape of a slotted hose. In the outer area, at a distance to the outer surface of the vehicle body covering, a reinforcing element 7 is inserted into the slot 5 which, in the illustrated embodiment, consists of band material. The reinforcing element 7, which extends approximately parallel to the outer surface of the vehicle body covering is form-lockingly retained in corresponding apertures 8 of the elastic profile 2.

Figure 2:
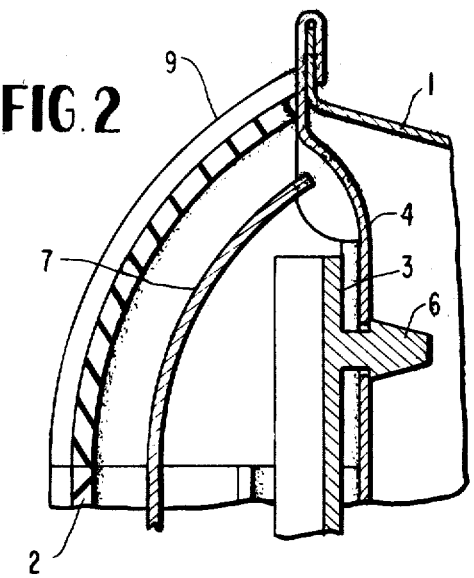
FIG. 2 is a partial cross-sectional view taken along line II—II of FIG. 1.
Figure 3:
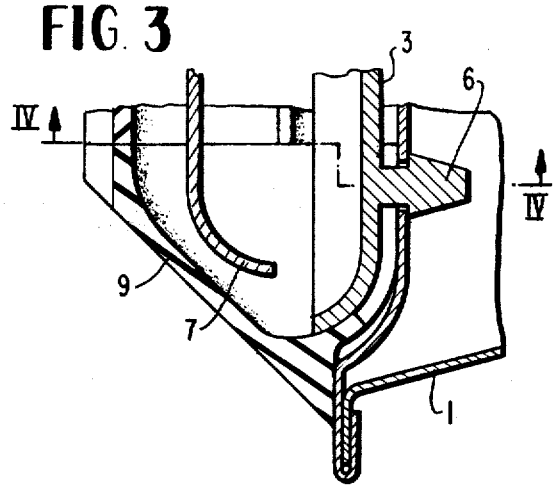
FIG. 3 is a further partial cross-sectional view taken along another portion of line II—II of FIG. 1.
Figure 4:
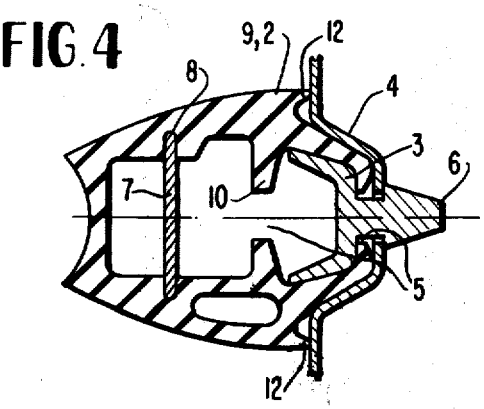
FIG. 4 is a cross-sectional view taken along line IV—IV of FIG. 3.
Figure 5:
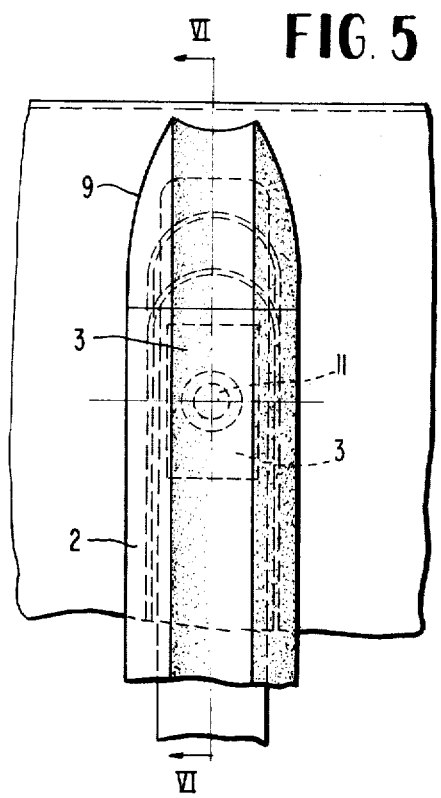
FIG. 5 is a partial elevational view of a further embodiment of a protective strip according to the present invention.
Figure 6:
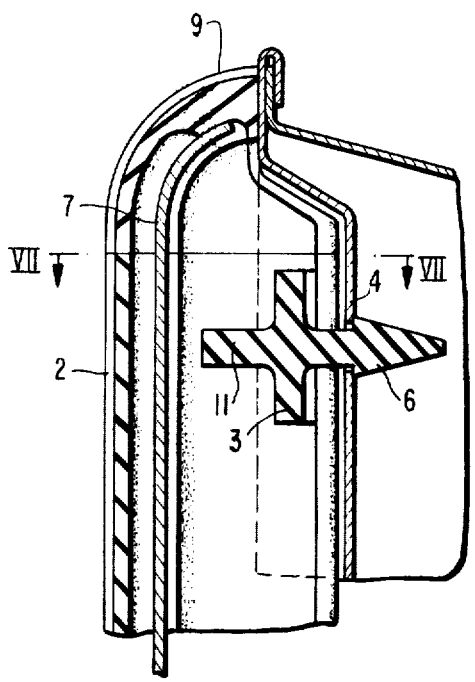
FIG. 6 is a cross-sectional view taken along line VI—VI of FIG. 5.
Figure 7:
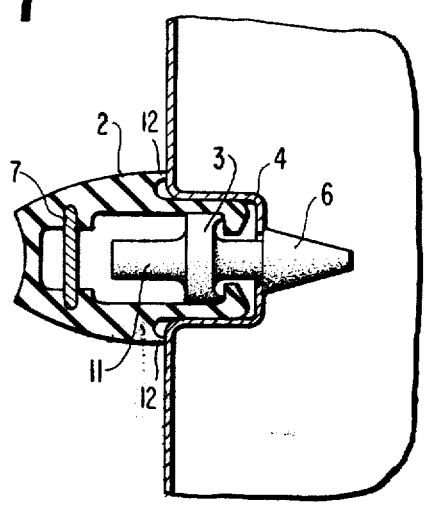
FIG. 7 is a cross-sectional view taken along line VII—VII of FIG. 6.
Figure 8:
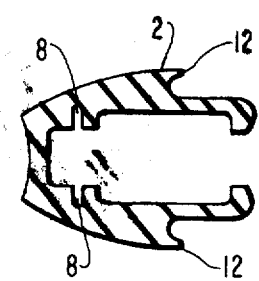
FIG. 8 is a cross-sectional view illustrating the detail of a protective strip according to FIGS. 5 to 7 in a cross-sectional view similar to FIG. 7.

As can be seen from FIGS. 2 and 3, the reinforcing element 7 extends within the area of the ends of the protective strips with a curvature toward the contour of the vehicle body covering 4. Additionally, the indentation 4 of the vehicle body covering terminates within this area. Separately manufactured end pieces 9 adjoin the elastic profile 2 in this end area which are secured in a corresponding manner by the retaining profile 3 at the vehicle body covering. Additionally, they accommodate or receive the reinforcing element 7 so that they can be aligned without difficulty exactly with respect to the elastic profile 2.

The end pieces 9 consist of the same material as the remaining elastic profile 2. In the end area illustrated in FIG. 2, the end piece 9 continues essentially the contour of the elastic profile 2 whereby it simultaneously passes over gradually with a curvature into the surface of the vehicle body covering. In contradistinction thereto, the end piece illustrated in FIG. 3 continues the contour of the elastic profile 2 only for a short distance and then runs out with an inclined surface into the outer surface of the vehicle body covering. By the use of separately manufactured end pieces 9, it is possible to utilize extruded elastic profiles 2.

In order to be able to press in the retaining profile 3 together with its clips 6 into the corresponding bores of the indentation 4, the elastic profile 2 includes adjoining the outwardly pointing legs of the retaining profile 3 inwardly directed extensions 10 which fix the retaining profile 3 in its position and thus enable a clipping-in by applying pressure on the elastic profile 2.

The embodiment of the present invention illustrated in FIGS. 5 to 8 corresponds essentially to the embodiment according to FIGS. 1 to 4. In this embodiment, the indentation 4 of a motor vehicle door has an approximately rectangular configuration. Also in this embodiment, the elastic profile 2 constructed essentially as slotted hose is drawn into the indentation 4 by a retaining or mounting profile 3 made in one piece with the clips 6. The retaining profile 3 is also constructed in one piece with the clips 6 in this embodiment. However, it consists only of short individual elements so that one may also speak only of clips. In order to be able to press-in this retaining profile 3 or clips 6 into the corresponding bores of the vehicle body covering 4 from the outside, the retaining profiles 3 or clips 6 are provided with an extension 11 extending outwardly beyond the retaining profile 3.

Both in the embodiment according to FIGS. 1 to 4 as also in the embodiment according to FIGS. 5 to 8, the elastic profile 2 includes sealing lips 12 extending over the edge of the indentation 4 which are adjoined inwardly by channel-like hollow spaces.

A protective strip is illustrated in FIGS. 9 and 10 which includes an elastic profile 2 which is secured in an indentation 4 of a vehicle body covering, for example, in a manner corresponding to the embodiment according to FIGS. 5 to 8. In this embodiment, an approximately U-shaped profile 13 is provided as reinforcing element whose leg portions point toward the vehicle body covering and are slightly inclined toward one another. The outer side of this reinforcing profile 13 is completely surrounded by the elastic profile 2. Also with this type of reinforcing profile 13 the elastic effect of the protective strip is not impaired or only slightly impaired since in case of loads perpendicular to the vehicle body covering 4, the reinforcing profile 13 can displace itself into the indentation 4.

The embodiment of a protective strip illustrated in FIG. 11 also includes an elastic profile 2 which is secured in an approximately rectangular indentation or recess 4 of a vehicle body covering. In this embodiment, a profile 14 is provided which simultaneously represents the mounting and reinforcing profile. This profile 14 which has an approximately U-shaped cross section is so inserted into the elastic profile 2 provided with a slot that its leg portions point toward the vehicle body covering. The leg portions are supported on the inside of the indentation 4 of the vehicle body covering against inwardly projecting extensions 15 of the elastic profile 2. Clips 16 with a relatively long stem engage in the profile 14, which are pressed into bores of the bottom of the indentation 4. The clips 16 can be securely connected with the profile 14 or can be inserted only when the profile 14 is inserted into the slot of the elastic profile 2.

In FIG. 12, an elastic profile 14 is illustrated which has a continuous U-shaped cross section that remains the same. In contradistinction thereto, the profile 14 of the embodiment according to FIG. 13, serving also as reinforcing and retaining profile receives a trough-like configuration in that its leg portions form a closed peripheral ring. It becomes possible in this manner to center exactly the reinforcing and retaining profile 14 in the indentation 4 of the vehicle body covering also in the longitudinal direction of the protective strip.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A protective strip arrangement for motor vehicles having a vehicle body covering provided with a recess having upper and lower walls for accommodating the protective strip, the protective strip arrangement comprising:

an elastic profile means,
   a longitudinal slot means provided in said profile means substantially along the entire length thereof on its side facing the vehicle body covering,
   a substantially C-shaped cavity provided in said elastic profile means overlapping the recess, said substantially C-shaped cavity being defined by a pair of spaced leg portions, at least a portion of each of said spaced leg portions is disposed substantially parallel to the upper and lower walls of the recess,
   a retaining profile means disposed in and extending substantially along the entire length of said substantially C-shaped cavity, said retaining profile means including projecting means for pressing said portions of said spaced leg portions of said substantially C-shaped cavity against the upper and lower walls of the recess,
   fastening means for fastening the elastic profile means to the body covering, and
   a reinforcing element disposed in and between the leg portions of said substantially C-shaped cavity and extending substantially in the longitudinal direction of said profile means.

2. A protective strip according to claim 1, wherein the recess includes a back wall extending between the upper and lower walls, and wherein said fastening means includes clips for securing said retaining profile means at the back wall of the recess.

3. A protective strip according to claim 2, wherein the reinforcing element and the retaining profile means are constructed in one piece and consist of a bar of substantially U-shaped cross section having the bight portion thereof disposed adjacent the bight portion of said substantially C-shaped cavity with the leg portions of the U-shaped bar projecting toward and between the upper and lower walls of the recess provided in the vehicle body covering.

4. A protective strip according to claim 2, wherein the clips are made in one piece with the retaining profile means.

5. A protective strip according to claim 4, wherein the retaining profile means is subdivided into short individual pieces.

6. A protective strip according to claim 5, wherein the protective strip includes end portions and wherein the reinforcing element consists of band material disposed approximately parallel to the surface of the vehicle body covering and curved toward the vehicle by a covering at the end portions of the protective strip.

7. A protective strip according to claim 6, wherein end pieces which run out into the surface of the vehicle body covering adjoin the end portions of the protective strip, and wherein the reinforcing element extends up to and into the end pieces.

8. A protective strip according to claim 6, wherein end pieces which run out into the surface of the vehicle body covering adjoin the end portions of the protective strip, and wherein the retaining profile means extend up to and into the end pieces.

9. A protective strip according to claim 6, wherein end pieces which run out into the surface of the vehicle body covering adjoin the end portions of the protective strip, and wherein the reinforcing element and the retaining profile means extend up to and into the end pieces.

10. A protective strip according to claim 9, wherein the reinforcing element and the retaining profile means are constructed in one piece and consist of a bar of substantially U-shaped cross section having the bight portion thereof disposed adjacent the bight portion of said substantially C-shaped cavity with the leg portions of the U-shaped bar projecting toward and between the upper and lower walls of the recess provided in the vehicle body covering.

11. A protective strip according to claim 1, wherein the retaining profile means is subdivided into short individual pieces.

12. A protective strip according to claim 1, wherein the protective strip includes end portions and wherein the reinforcing element consists of band material disposed approximately parallel to the surface of the vehicle body covering and curved toward the vehicle by a covering at the end portions of the protective strip.

13. A protective strip according to claim 1, wherein end pieces which run out into the surface of the vehicle body covering adjoin the end portions of the protective strip, and wherein the reinforcing element extends up to and into the end pieces.

14. A protective strip according to claim 1, wherein end pieces which run out into the surface of the vehicle body covering adjoin the end portions of the protective strip, and wherein the retaining profile means extend up to and into the end pieces.

15. A protective strip according to claim 1, wherein end pieces which run out into the surface of the vehicle body covering adjoin the end portions of the protective strip, and wherein the reinforcing element and the retaining profile means extend up to and into the end pieces.

16. An arrangement according to claim 1, wherein mounting means are provided in said cavity for mounting said reinforcing element.

17. An arrangement according to claim 16, wherein said reinforcing element consists of a band of material, and wherein said mounting means includes slots disposed in said profile means for mounting said band material substantially parallel to the surface of the vehicle body covering.

18. An arrangement according to claim 1, wherein said retaining profile means is substantially U-shaped in cross section with the leg portions thereof extending toward the vehicle body covering.

19. An arrangement according to claim 1, wherein said reinforcing element is a profile element substantially U-shaped in cross section with the leg portions thereof extending toward the vehicle body covering.

20. An arrangement according to claim 1, wherein said reinforcing element and said retaining profile means are an integrally constructed element, and wherein said integrally constructed element is substantially U-shaped in cross section having the bight portion thereof disposed adjacent the bight portion of said substantially C-shaped cavity, the leg portions of the U-shaped element extending toward and between the upper and lower walls of the recess provided in the vehicle body covering.

21. An arrangement according to claim 1, wherein said retaining profile means is subdivided into a plurality of individual pieces spaced along said elastic profile means in the longitudinal direction thereof.

* * * * *